(No Model.)

A. H. FREIBERG.
METHOD OF MAKING APPLIQUÉ WORK FROM PLASTIC MATERIAL.

No. 535,947.  Patented Mar. 19, 1895.

Witnesses:

Inventor:
Albin H. Freiberg,
By Dyrenforth & Dyrenforth
Attys.

UNITED STATES PATENT OFFICE.

ALBIN H. FREIBERG, OF CHICAGO, ILLINOIS.

METHOD OF MAKING APPLIQUÉ WORK FROM PLASTIC MATERIAL.

SPECIFICATION forming part of Letters Patent No. 535,947, dated March 19, 1895.

Application filed May 28, 1894. Serial No. 512,742. (No model.)

*To all whom it may concern:*

Be it known that I, ALBIN H. FREIBERG, a citizen of the United States, residing at Chicago, in the county of Cook and State of Illinois, have invented a new and useful Improvement in Methods of Making Appliqué Work from Plastic Material, of which the following is a specification.

My invention relates to improvement in the method of making appliqué ornaments of putty or similar plastic material for picture-frames, wall and ceiling decorations and the like, in the form of flowers, leaves, scroll-work and analogous designs, as well as in the articles so produced.

In the manufacture of appliqué-work from plastic material, it has been usual hitherto to provide a frame or skeleton of lengths of wire suitably fastened together to produce a foundation over which the plastic material could be molded into desired shape, the molding being done by hand, and the wires acting as a strengthening core for the plastic material which, since it becomes brittle when dry, would otherwise be easily broken.

To make appliqué-work, such as sheaves of grain, leaves, flowers, elaborate scrolls and the like, in the manner described, is slow and laborious and requires skill of a high order on the part of the operator. Such ornamentation, therefore, while greatly admired, has hitherto been comparatively expensive and but little employed on that account. My object is to render this class of ornamentation easy and simple of manufacture, besides making it more true to nature and more durable.

In carrying out my invention a core-piece is cut, by means of a die, or otherwise, out of a sheet of more or less soft, pliable, and, preferably, non-corrosive metal, as zinc, copper or the like. Plastic material is then molded, in suitable intaglio-molds, to produce the opposite surface-portions of the ornamentation, the plastic parts being flat on their reverse sides and somewhat larger in outline than the core-piece. The surface portions before becoming dry, and while still plastic, are fastened by means of a suitable glue or cement against opposite sides of the metal core, the projecting portions at the outlines being pressed together and caused to adhere. Parts of the plastic portions with the interlying core may then be bent to curve and extend at different angles, as may be desired to remove the appearance of stiffness. When dry the article may be gilded or suitably colored.

Figure 1:
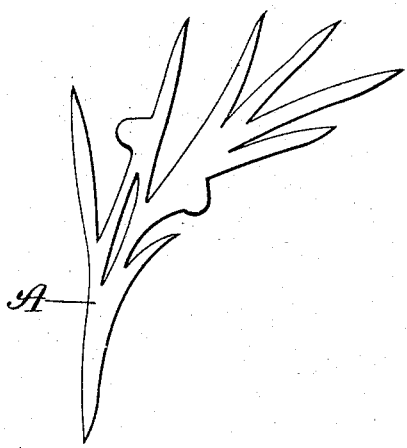
Figure 2:
Figure 4:
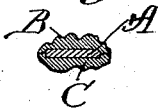
Figure 3:

In the drawings I show for the sake of illustration, a spray representing wheat leaves and flowers made in accordance with my invention, Figure 1 being the core-piece; Figs. 2 and 3, the obverse and reverse sides, respectively, of the finished article; and Fig. 4 an enlarged section taken on line 4 of Figs. 2 and 3.

The core-piece A is cut out of a sheet of metal, preferably zinc, by means of a suitable die. The obverse surface-portion B, and reverse surface-portion C, are formed of a plastic material, preferably of the kind termed "putty" in the art of molding-manufacture, and having as main constituents whiting and glue. The parts B and C are formed in suitable molds, the particular die and molds being made with relation to each other to produce a core A and plastic portions B and C which will be more or less nearly exact in outline. In practice the plastic material is very soft when turned from the molds and is permitted to become somewhat dry and hard, though not to a condition of brittleness, before the parts are fastened together. The parts B and C are formed slightly wider and longer at all parts than the core-piece, to completely envelop the latter, and glue is applied to the rear flat surfaces of the plastic portions. While the glue may not adhere to the metal, it will fasten together the edge-portions of the plastic parts, beyond the edges of the core-piece, and thus hold them securely together. When the glue has become sufficiently set, the leaf-portions of the ornamentation may be bent and twisted with the fingers to give them natural curves, and the article is then permitted to dry. The different parts of the article will harden in the shapes given to them; and, owing to the core-piece, the finished article will be particularly strong and durable.

It will be understood that articles much more elaborate in detail and outline than the spray illustrated may be formed by my improved method; and by varying the twists and turns in the parts of the different articles as they are shaped, they may be caused to vary quite materially in appearance. Thus a number of ornaments formed with the same die and molds, may be fastened upon a picture-frame, or employed in other connections, and present sufficient variety in the matter of detail to remove the set appearance or stiffness, which in this class of ornamentation it is desirable to avoid.

Little skill is required on the part of the operator to form ornamental pieces, of the class described, by my improved method; and they may be made with great rapidity. The variety of ornamental articles which may be produced by practicing my improved method is practically endless, while under the old method, of employing wires, the variety is necessarily limited. My invention, therefore, opens up a new field in the matter of ornamentation for picture-frames, and the like, the ornamentation being novel, eminently artistic in effect and comparatively inexpensive.

What I claim as new, and desire to secure by Letters Patent, is—

1. The method of producing appliqué-work, of the character described, which consists in forming a core-piece out of more or less pliable sheet-metal, forming the opposite surface-portions of the article in molds out of plastic material which hardens under exposure, cementing the surface-portions together on opposite sides of the core-piece, and then bending the article, in places, before the plastic-material becomes hard, substantially as set forth.

2. An appliqué ornament, comprising a core-piece of pliable sheet-metal, and surface-portions, separately molded out of plastic material, and cemented together on opposite sides of the core-piece, substantially as described.

3. An appliqué ornament, comprising a core-piece A of pliable sheet-metal and surface-portions B and C of molded putty cemented together on opposite sides of the core-piece and projecting beyond the edges thereof, substantially as described.

ALBIN H. FREIBERG.

In presence of—
M. J. FROST,
W. N. WILLIAMS.